July 2, 1929.                L. C. HUCK                1,719,372
                               BRAKE
                         Filed July 10, 1922           4 Sheets-Sheet 1

Inventor:
Louis C. Huck,
by Wallace R. Lane
Atty.

July 2, 1929.　　　　L. C. HUCK　　　　1,719,372
BRAKE
Filed July 10, 1922　　　　4 Sheets-Sheet Inventor:
Louis C. Huck,
by Wallace R. Lane
Atty.

July 2, 1929.  L. C. HUCK  1,719,372
BRAKE
Filed July 10, 1922    4 Sheets-Sheet 4

Inventor;
Louis C. Huck,
by Wallace R. Lane
Atty.

Patented July 2, 1929.

UNITED STATES PATENT OFFICE.

1,719,372

LOUIS C. HUCK, OF CHICAGO, ILLINOIS, ASSIGNOR TO HUCK AXLE CORPORATION, OF CHICAGO, ILLINOIS, A CORPORATION OF ILLINOIS.

BRAKE.

Application filed July 10, 1922. Serial No. 573,946.

This invention relates to brakes adapted for use in automotive vehicles but being capable of use in hoisters, elevators and various other and similar apparatus, machinery and constructions, and constitutes an improvement over the brake shown and described in the copending application of myself and Martin Twight, filed September 25, 1920, Serial No. 412,841.

In the brake of the present invention, as in that of said copending application, the means for applying the braking force is of the floating or differentially acting type to substantially equalize the pressure between the brake shoes or other equivalent braking elements regardless of unequal movement required to bring the braking elements into engagement with the brake drum. As will be hereinafter more fully explained one of the braking surfaces will wear faster than the other, and it becomes highly desirable at times to adjust or center the shoe or braking element with relation to the brake drum.

Among the objects of this invention is to provide an improved internal expanding brake mechanism wherein the braking action (hereinafter more fully described) will always assist in the application of the brakes to the maximum extent possible regardless of the direction of rotation of the braking drum, and regardless of uneven wear of the brake lining; further to provide an internal expanding brake mechanism having means whereby the shoes or braking elements can be caused to automatically center or adjust themselves so that the brake lining is, in its worn condition, substantially concentric with the brake drum to allow the brake to run freely, even though a very small amount of lost motion is allowed, and even though the opposite sides of the brake lining are unequally worn; further to provide for such adjustment to compensate for irregularities in surfaces, distortion of parts, discrepancies or variations in machining, etc., in assembling the parts of new brakes as well as adjustment for wear in used brakes; further to provide novel means for effecting said adjustment of the brake shoe or shoes; further to provide a more simple, economical and efficacious mechanism of the class described; and such further objects, advantages and capabilities as will later more fully appear and are inherently possessed by the device.

This invention further resides in the combination, construction and arrangement of parts illustrated in the accompanying drawings, and while I have shown therein preferred embodiments, I desire the same to be understood as illustrative only and not as limiting my invention.

Referring to the drawings:—

While I have shown two brakes within the brake drum (one for operation by a foot pedal and the other by a hand lever), the same are substantially alike, except for their being reversely positioned to permit the operating cams and anchoring pins for the respective brakes to be located at diametrically opposite points, and I will for the sake of clearness describe only one brake, it being understood that with the above exceptions the same description applies to the other brake.

Figures 3, 4, 5:
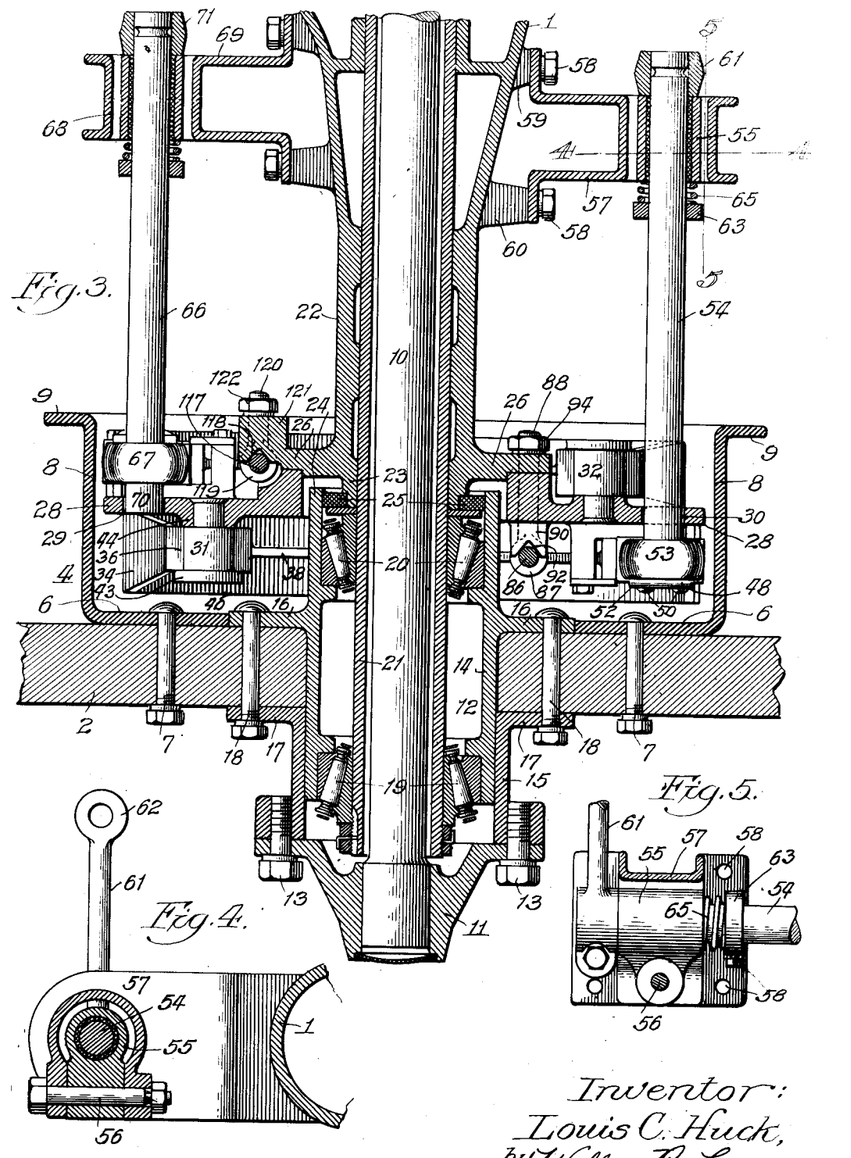
Fig. 3 is a section on line 3—3 of Fig. 2.
Fig. 4 is a detail sectional view taken on the line 4—4 of Fig. 3.
Fig. 5 is a section taken on the line 5—5 of Fig. 3.

Referring more particularly to the drawing, my invention is shown with an axle assembly comprising a differential casing 1 housing suitable power driving or transmitting mechanism operatively connected to the driving wheels 2 and 3 of an automotive vehicle, such as a truck. To these wheels, on the inner side thereof, are respectively fixed brake drums 4 and 5, these drums each having a web portion 6 by which the drum is rigidly secured to the wheel 2 by means of bolts 7 passing through the wheels as shown in Fig. 3 of the drawing. Each drum also has a braking or rim portion 8 and an annular flange 9.

The driving power is transmitted to the wheels through a shaft or axle 10 operatively geared at one end thereof to the differential mechanism housed in the casing 1 and suitably fixed at the other end to a hub cap 11 secured to a hub 12 by bolts 13. The hub 12 comprises a barrel 14 extending through the wheel 2 and a collar 15 telescopically fitting over the outer end of the barrel 14. The barrel 14 and collar 15 are respectively formed with flanges 16 and 17 applied to opposite sides of the wheel 2 and rigidly bolted thereto by bolts 18 passing transversely through the wheel, as clearly shown in Fig. 3 of the drawing. At the end of the hub 12 are carried roller bearings 19 and 20, of suitable structure, for rotatably connecting the hub 12, and hence the wheel 2 and drum 4, to a relatively stationary tubular sleeve 21 housing the shaft 10 and suitably secured to the axle housing 22 forming an integral part of the casing 1. The inner ends 23 and 24, respectively, of the axle housing 22 and hub 12, are adjacently located and connected by suitable packing 25 to prevent leakage of lubricant from the bearing 20.

Figure 6:
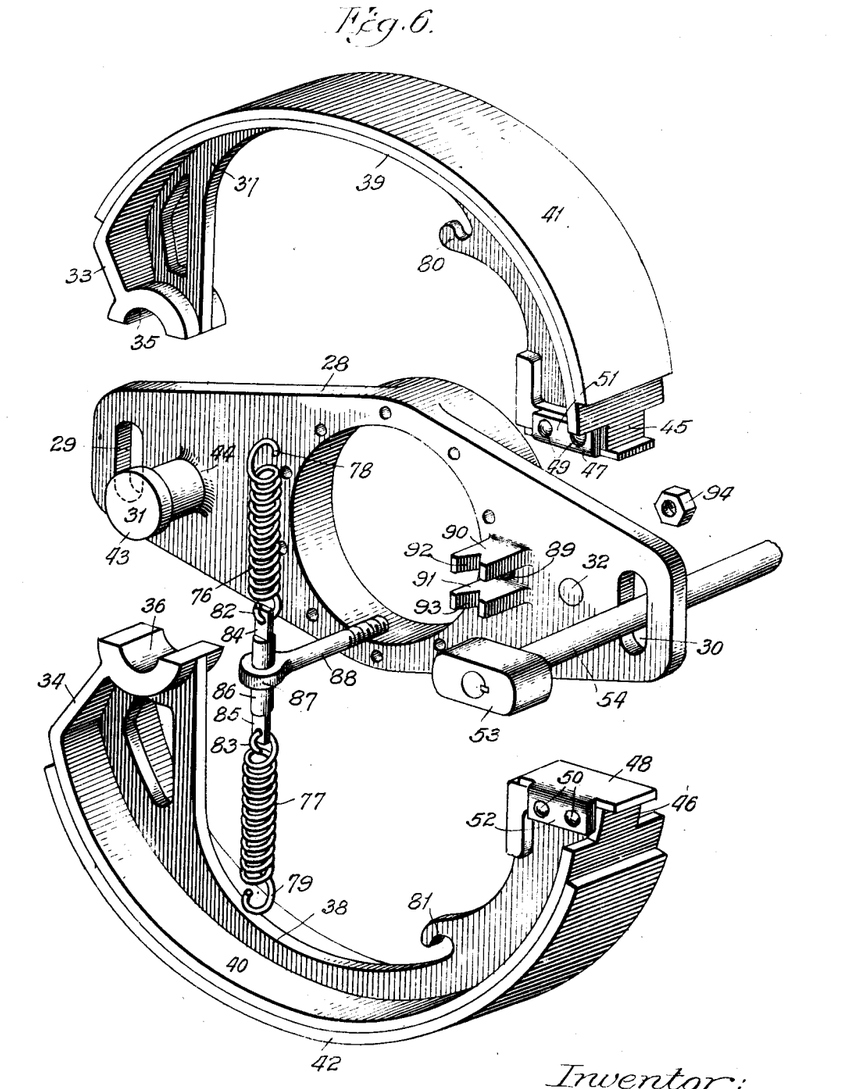
Fig. 6 is a perspective view showing the parts in separated relation and suggesting the manner of their assembly.
Figure 8:
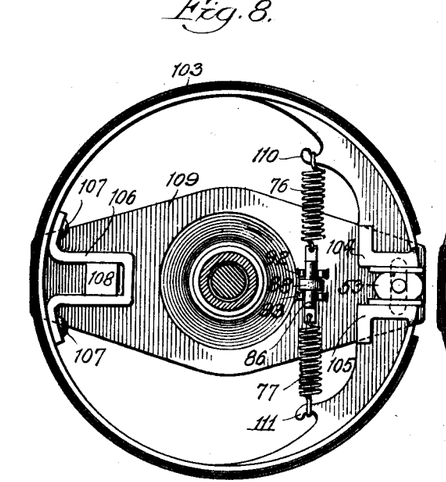
Figs. 8 and 9 are views similar to Fig. 2, but showing further modifications.

The inner end portion of the axle housing 22 has a flange 26 to which is fixed, as by rivets, bolts or the like 27, a brake anchor or spider 28 provided near its ends, with slots 29 and 30 and headed anchor pins or studs 31 and 32, as shown in Figs. 3 and 6 of the drawing, the anchor pin 31 and slot 30 being of utility for one set of braking elements hereinafter described, and the anchor pin 32 and slot 29 being of like utility for the other set of braking elements reversely located to that hereinafter described but being otherwise constructed and operated in the same manner as that described. Upon the anchor pin 31 are pivotally supported two arc shaped brake shoe members 33 and 34 having segmental bearings 35 and 36, reinforcing webs 37 and 38 and flanges 39 and 40 carrying brake linor rim segments 41 and 42. The bearing segments 35 and 36 fit over the shank of the anchor pin between the head 43 thereof and a boss 44 forming part of the brake anchor or spider and are out of contact with each other to permit free and independent movement of each shoe. While I herein describe, and show upon the drawing, two separate shoe members, it is to be understood that the invention is not limited to that but a one piece substantially circular shoe having suitable braking surfaces may be used and have the same or substantially the same result, such single-piece shoe having suitable means for connecting it to the anchor pin 31, and relative movement between the shoe segments or braking surfaces being allowed for by a distortion or bending of the shoe at suitable flexible parts thereof, as represented in Fig. 8 of the drawings.

To the ends 45 and 46 of the shoe members are secured hardened cam plates 47 and 48 by means of rivets, bolts and the like 49 and 50 passing through flanges 51 and 52 of the plates. These plates are normally held spaced or separated by an elongated cam 53 keyed to an end of a shaft 54 passing freely through the slot 30 and being rotatably supported at its other end in a bearing block 55. The latter is rockably supported upon a pivot bolt 56 carried by a bracket 57 rigidly fastened by bolts 58 or the like to studs or bosses 59 and 60 forming integral parts of the casing 1, as clearly shown in Figs. 3, 4 and 5 of the drawing. To the extreme end of the shaft 54, on one side of the bearing 55, is fixed a brake rod lever or arm 61, the upper end of which has a pivot bearing 62 for connection with the brake pull rod suitably connected to a brake lever near the driver's seat. Near the other side of the bearing 55 is fastened a collar 63 to the shaft 54 and between this collar and the proximate end of the bearing block is interposed a spring 65 which resiliently holds the shaft 54 in proper longitudinal relation with the brake mechanism.

Figure 1:
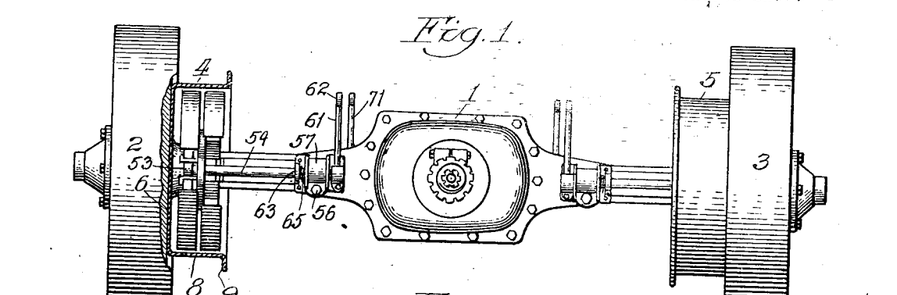
Fig. 1 is a rear elevation of an assembled truck axle, wheels and brakes embodying my invention, parts being shown in section for the sake of clearness.
Figure 2:
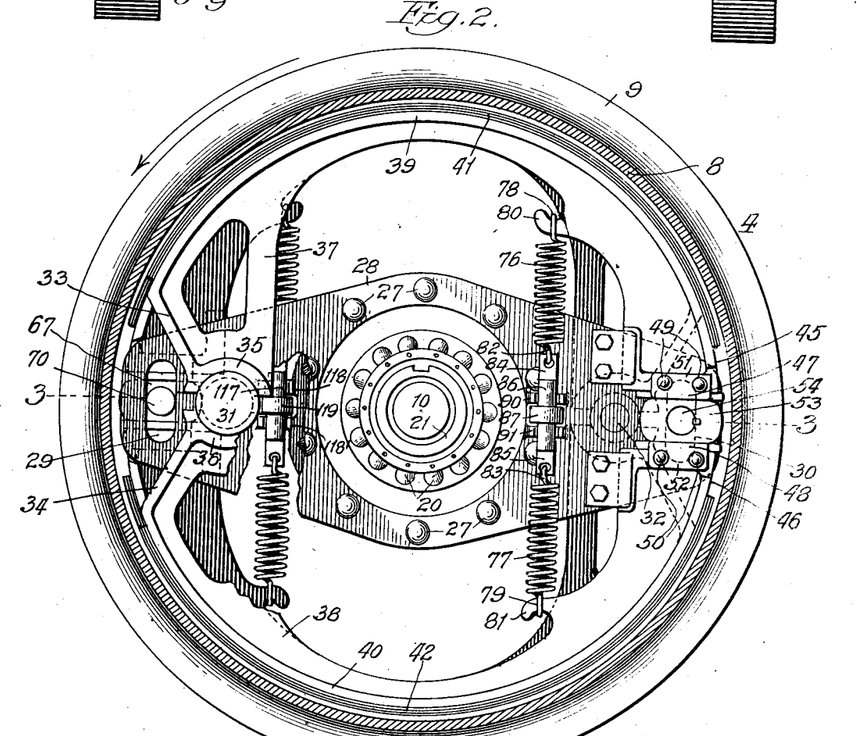
Fig. 2 is a vertical side view of the brake mechanism with the drum in section.

On the other side of the axle housing 22 is a shaft 66 having a cam 67 near one of its ends and supported in a bearing 68 rockably pivoted to the bracket 69 in the same way as shaft 54 is connected and supported, the shaft 66 being of utility to operate the set of shoe members on the reverse side of that above described. Inasmuch as shaft 66 operates the mechanism on the opposite side of the brake anchor or spider, it has an overhanging end portion 70 extending into the slot 29, as shown in Figs. 2, 3 and 6 of the drawing. In other respects this part of the structure is identical to the mechanism connected to shaft 54, the lever 71 fastened to the other end of the shaft 66 being suitably connected to another brake pull rod leading to another lever near the driver's seat.

It will be noted that normally, the cam 53 is located between the cam plates 47 and 48 with its shortest dimension extending between said plates. When the shaft 54 and cam 53 are turned or rotated about the axis of the shaft 54 the end portions of the cam act against the plates 47 and 48 to move them further apart, and hence the respective ends of the shoe members 39 and 40 and the brake linings 41 and 42 thereon, such movement causing an engagement of the brake linings with the inner surface of the rim 8 of the drum 5. Such relative movement of the shoes 41 and 42 is resiliently resisted by a pair of helical springs 76 and 77 having hooked ends 78 and 79 connected to hooks 80 and 81 respectively formed on the shoe members 39 and 40 and hooked ends 82 and 83 connected to the perforated ends 84 and 85 of equalizing bar 86 extending through the eye 87 of an eye-bolt 88. This bolt passes through a perforation 89 provided in the brake spider 28 as shown in Fig. 6 of the drawing.

Preferably integrally formed with the spider 28 and at both sides of the perforation 89 on one side of spider, are a pair of spaced and substantially parallel studs 90 and 91 having V-shaped seats or saddles 92 and 93 against which the equalizing bar 86 is normally seated and clamped when the nut 94 is tightened to draw up the bolt 88. When the nut 94 is loosened, the bar 86 is capable of moving longitudinally and allow for equalization of the tension of the springs 76 and 77, as will later more fully appear. The action of the springs 76 and 77 is to normally draw the shoe members 39 and 40 toward each other whereby a clearance space is normally maintained between the brake linings 41 and 42 and the inner face of the rim portion 8 of the drum 4, and also to maintain the plates 47 and 48 in contact with the cam 53 and support and position the latter.

Figure 7:
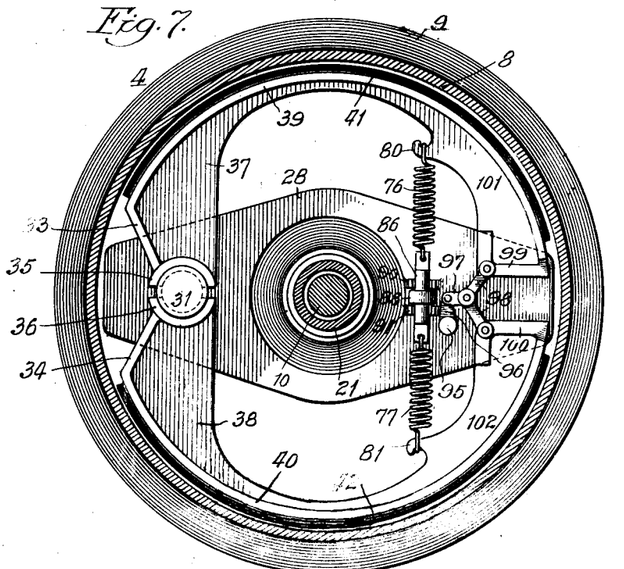
Fig. 7 is a view similar to that of Fig. 2, but showing a modified form of actuating means.

In Fig. 7 is shown a brake mechanism having the same general structure as above described with the exception of using a toggle means in lieu of a cam for separating the shoe members, thus illustrating an application of the invention to a toggle type of brake mechanism. In this structure a shaft 95, corresponding to the shaft 54 of the structure shown in Figs. 1 to 6 inclusive, is fixed to an arm 96 pivotally connected to a link 97 pivoted to a pair of toggle struts 98 pivoted to the ends 99 and 100 of the shoe members 101 and 102. In other respects the structure is the same and operates the same as that above described.

In Fig. 8 is shown another application of the invention to a brake mechanism of the flexible brake shoe type having means by which it may be connected to the anchor pin or the brake spider. Movement of the shoe ends and the lining carrying portions of the shoe is allowed for by a distortion or bending of the flexible parts of the shoe. In this structure the shoe 103 is of substantially circular form and has ends 104 and 105 which are separable by a cam 53 (see Fig. 8) by a flexing of the shoe, particularly the portions thereof at the left side of the device as viewed in Fig. 8 of the drawing. An anchor strap 106 is suitably fastened to the shoe by rivets, bolts, or the like 107 and fits over an anchor pin 108 fast with the brake spider 109. The shoe has hooks 110 and 111 to which are connected springs 76 and 77 also connected at their other ends to the equalizing bar 86 held in saddles 92 and 93 by the eye bolt 88, as in the structure shown in Fig. 6 of the drawing.

Figure 9:
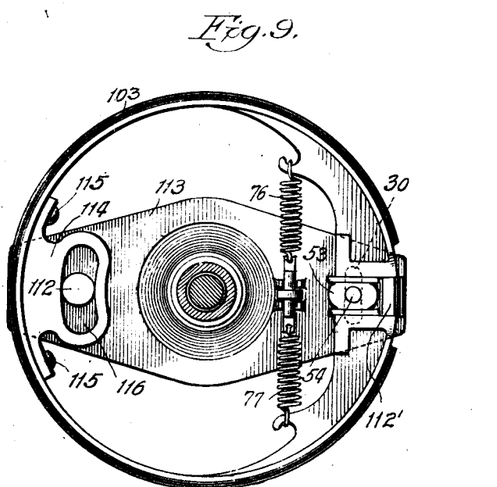

In Fig. 9 is further shown another application of the invention to a brake mechanism of the same type as shown in Fig. 8 of the drawing except providing for a floating connection with the guide pin 112 fixed to the brake spider 113, the shoe having secured to it a slotted member 114 by means of rivets, bolts or the like 115. This member has an arc shaped slot 116 for reciprocably receiving the guide pin 112. The other end of the spider has a slot 30, the same as in the construction shown in Fig. 6, for the passage of the shaft 54 for the cam 53 and also has at its end a brake anchor 112' acting as an anchor to limit the movement of the braking elements. The shaft 54 will also have a floating play in the slot 30 when the cam ends of the shoe offer unequal resistances to the cam 53.

The opposite side of the brake mechanism is substantially a reverse duplicate of the side above described with the exception of the end 70 of the shaft 66, above described, and the location of the clamping bolt for the equalizing rod for that side of the mechanism. These differences are made in order that the cams 53 and 67 may be operated from the same side of the brake mechanism and also in order that the equalizing device may be accessible and adjusted from the same side of the mechanism, as clearly shown in Fig. 3 of the drawing. This equalizing device is similar in structure to that above described and comprises an equalizing bar 117 clamped against the saddle 118 and 118' by the eye 119 of the eye bolt 120 passing through boss 121 formed integral with the flange 26 of the axle housing 22, the bolt 120 having a nut 122 for effecting the clamping action, the same as nut 94 operates. In other respects this side of the brake mechanism is identical to and operates the same as the other side thereof above described.

Referring now to the operation of the mechanism and assuming the device to be in condition shown in Fig. 2 of the drawing where the brake shoe, and the linings carried thereby, are positioned so that they are substantially concentric with the brake drum with equal clearances between the linings of both shoe members and the inner surface of the brake drum, a turning of the shaft 54 together with the cam 53 causes a spreading or separating of the cam plates 47 and 48 together with the brake shoe members 39 and 40 and the brake linings 41 and 42 so that the latter contact or frictionally engage with the inner face of the rim 8 of the brake drum 4. This frictional engagement tends to rotate the brake shoe members with the brake drum. This tendency to rotate is resisted or prevented by the anchor pin 31 forming a part of the stationary portion of the mechanism. The shoe member 39 has a greater braking or retarding action than the shoe member 40, due to the shoe member 39 turning about the pin 31 in the direction of rotation of the drum. This adds to the rotative effort about pin 31 imparted to the shoe member 39 by the cam 53, or, in other words, the shoe member 39 will tend to wedge itself between the brake drum and the anchor pin 31. At the same time the shoe member 40 tends to swing about the pin 31 in a direction tending to disengage the shoe member 40 from or reduce the pressure between it and the brake drum. Were the cam journaled in position, such as in the brake anchor or spider, so that it was not allowed free play or to float, this action of the shoe member 40 would strongly tend to oppose the efforts of the operator to rotate the cam, thus making the brake operate inefficiently. To avoid this the cam is carried on a shaft 54 which is capable of a limited vertical movement or floating action in the slot 30 formed in the spider 28, the other end of the shaft rocking on the pivot pin 56 for such purpose. It is to be understood that while I have described a particular floating or differentially acting actuation means for illustrating the invention, the latter is not limited to any particular means, said floating means being capable of modification and change without departing from the spirit of my invention. For a clockwise rotation of the brake drum the conditions are exactly reversed so that the shoe member 40 has a greater braking action than the shoe member 39 for the same reasons as mentioned above. It will therefore be apparent from the above that as the rotation of the drum tends to rotate the shoe in one direction, the shoe members, together with the anchor pin 31 and the brake spider 28, tends, as an assembly, to rotate in the same direction and a certain amount of loose play is required for a proper operation of the mechanism.

With a brake drum generally operating in one direction, such as a counter clockwise direction, the brake lining 41, in such case, becomes worn more quickly and to a greater extent than lining 42. As a result, the equal clearances originally provided between the linings and the drums and the equal tensions originally present in the springs 76 and 77, will vary when the linings are both in contact with the drum or after lost motion has been taken up to a point where the lining having the least clearance engages the drum and while there is still a clearance between the drum and the other lining. Inasmuch as the shoe 39 must now move to a greater extent to effect a braking contact with the drum, the spring must stretch to a greater extent and be subjected to a greater tension. When the brake drum operates in the clockwise direction more than in the counter clockwise direction the same conditions will be conversely true, that is with respect to the brake lining 42 wearing down more rapidly and to a greater extent than the lining 41, and the equalizing bar 86 will move downwardly, when released, to equalize the tension of the springs 76 and 77, the spring 77, in this case, being the one under the greater tension. To adjust, compensate or substantially equalize these unequal clearances between the lining and the brake drum, the cam 53 is operated to separate the shoe members to bring the linings into contact with the inner face of the rim 8 of the brake drum 4. The nut 94 is then loosened and bolt 88 permitted to move so that the equalizing bar 86 is free to automatically move longitudinally. In the case where the wear on lining 41 is greater than that on lining 42 and there is a greater tension in the spring 76 than in the spring 77 the equalizing bar 86 will move upwardly, as viewed in Fig. 2 of the drawing, to a position where the tension is equalized between the springs. The nut 94 is again tightened and the bolt 88 drawn into place so as to tightly clamp the bar to the saddles 92 and 93 and to hold it there in fixed position. The cam 53 may now be released and the clearances between the linings 41 and 42 will be substantially equal.

While I have herein described and shown upon the drawing a few embodiments of my invention, it is to be understood that the invention is not limited to the particular constructions, details and arrangements of parts shown and described, but that other constructions, details and arrangements of parts are comprehended by the invention without departing from the spirit thereof.

Having now described my invention, I claim:—

1. In braking mechanism a brake drum, a pair of braking surfaces movable into and out of frictional engagement with said drum, means for applying pressure between said braking surfaces and said drum, means normally causing said braking surfaces to move out of engagement with the drum, and adjustable compensating means capable of being fixed against movement and which when released permits automatic equalization of the clearance between the braking surfaces and the drum.

2. A brake mechanism comprising correlated braking members, means for bringing said members into frictional engagement, means for disengaging said members, means adjustably connected to one of said members for equalizing the correlation of said members, and means for holding said adjustable means in adjusted position.

3. A brake mechanism comprising a rotatable brake drum, a brake shoe device having relatively movable parts, means for moving said parts into frictional engagement with said drum, means resisting said moving of said parts, and adjustable means for equalizing the resisting action of said resisting means on said parts, said adjustable means being lockable against movement and which when released will permit automatic equalization of said resisting action.

4. A brake mechanism comprising a rotatable brake drum, a brake shoe device having relatively movable parts, means for moving said parts into frictional engagement with said drum, means independently resisting such moving of each of said parts, said last means having an adjustable element lockable against movement and when released operable to equalize the resisting action of said parts.

5. A brake mechanism comprising a rotatable brake drum, a brake shoe device having relatively movable parts, means for moving said parts into frictional engagement with said drum, means independently resisting such movement of each of said parts, said last means having an adjustable element operable to equalize the resisting action of said parts and means for holding said element in adjusted relation.

6. A brake mechanism comprising a rotatable brake drum, a relatively stationary anchor member, a brake shoe device having relatively movable parts on said member, means for moving said parts into frictional engagement with said drum, an equalizing element connected to said member, means connected to said parts and said member and operable to resist such moving of said parts, said element being adjustable to equalize the resisting action of said means.

7. A brake mechanism comprising a rotatable brake drum, a relatively stationary anchor member, a brake shoe device having relatively movable parts on said member, means for moving said parts into frictional engagement with said drum, an equalizing element connected to said member, resilient means connected to said element and said parts for yieldably resisting said moving of said parts, said element being adjustable to equalize the resistance of said means.

8. A brake mechanism comprising a rotatable brake drum, a relatively stationary anchor member, a brake shoe device having relatively movable parts on said member, means for moving said parts into frictional engagement with said drum, an equalizing element connected to said member, springs connected to said parts and to said elements for independently resisting such moving of each of said parts, said element being adjustable for equalizing the resistance of said springs, and means for holding said element in adjusted position but operable to permit an automatic adjustment of said element.

9. A brake mechanism comprising a brake drum, a shoe cooperable therewith and having relatively movable parts, means including a shaft for spreading said parts for frictionally engaging said shoe with said drum, a rockable bearing for said shaft whereby said means has a rocking movement to compensate for unequal movements of said parts during the spreading action thereof.

10. A brake mechanism comprising a brake drum, a shoe cooperable therewith and having relatively movable parts, a supporting member for said shoe, a cam means operable to spread said parts for frictionally engaging said shoe with said drum, a shaft carrying the cam at one end thereof, a movable bearing supporting the other end of the shaft, whereby said cam means has a compensating movement for unequal movements of said parts during the spreading action thereof.

11. A brake mechanism comprising a rotatable brake drum, a shoe cooperable therewith and having relatively movable parts, an anchor member supporting said shoe, a cam operable to spread said parts for frictionally engaging said shoe with said drum, a shaft for said cam, a rockable bearing for supporting said shaft, said cam and shaft being movable with said rockable bearing for compensating for unequal movements of said parts.

12. A brake mechanism comprising a rotatable brake drum, a shoe cooperable with said drum and having relatively movable parts, a relatively stationary anchor member supporting said shoe, a cam operable to spread said parts for frictionally engaging said shoe with said drum, means for operating said cam, an equalizing bar, a clamping means on said anchor member, springs connected to said equalizing bar and to said parts, said springs operating to disengage said shoe from said drum, said clamping means normally holding said equalizing bar in fixed position relative to said anchor means and operable to release said bar for automatically equalizing the forces of said springs for equalizing the clearances between said shoe and drum.

13. In braking mechanism a brake drum, a fixed anchor element, brake shoes, means for applying pressure between said shoes and drum and arranged to substantially equalize the pressure applied between the shoes, a resilient support for said brake shoes and pressure applying means, and releasable means for attaching said resilient support to the anchor element and normally fixed to said anchor element, and capable when released of permitting said resilient support to automatically assume a position of substantial equilibrium of internal stresses.

14. In braking mechanism a brake drum, a fixed anchor element, brake shoes, means for applying pressure between said shoes and drum and arranged to substantially equalize the pressure applied between the shoes, resilient means for normally disengaging the shoes from the drum, said resilient means having an adjustable element lockable against movement and when released operable to permit said resilient means to automatically assume a position of substantial equilibrium of internal stresses.

15. In braking mechanism a brake drum, a fixed anchor element, brake shoes having free ends adapted to be spread apart, means for spreading said shoes and arranged to substantially equalize the spreading pressure on the shoes regardless of any unequal movement necessary to bring the shoes into contact with the drum, resilient means positioning said spreading means and having a portion releasably secured to said anchor element and when released movable to permit said resilient positioning means to assume a position of substantial equilibrium of internal stresses when said shoes are in contact with the drum.

16. In braking mechanism a brake drum, a fixed anchor element, a braking element having free ends movable into frictional engagement with said drum, a rotatable shaft adapted upon rotation to move the free ends of the braking element apart and to substantially equalize pressures on said free ends by lateral movement of the shaft, resilient means normally fixed to the anchor element for resisting the lateral movement of the shaft, said resilient means being releasable with relation to the anchor element to assume a position of substantial balance of internal stresses with the brake element in engagement with the drum.

17. In braking mechanism a fixed anchor element, a brake drum, brake shoes having adjacent free ends, a rotatable and laterally movable shaft, means rigid on said shaft and positioned between the free ends of the brake shoes for spreading the same upon rotation of said shaft, means for rotating said shaft, and resilient means for supporting the free ends of said shoes and said spreading mean, and releasable means for normally securing said resilient means to the anchor element and capable when released of permitting said resilient means to assume a substantial balance of internal stresses.

18. In braking mechanism a brake drum, brake shoes, floating means for spreading said shoes, resilient means resisting lateral movement of said floating means, and releasable means which when released automatically permits said resilient means to assume a position of substantial balance of internal stresses.

19. In braking mechanism a brake drum, a fixed anchor element, brake shoes, means for applying pressure between said shoes and drum and arranged to substantially equalize the pressure applied between the shoes, a resilient support for said brake shoes and pressure applying means, and releasable means for causing said resilient support to position said brake shoes and pressure applying means, said releasable means being normally engaged and capable when released of permitting said resilient support to automatically assume a position of substantial equilibrium of internal stresses.

20. In braking mechanism a brake drum, a fixed anchor element, brake shoes having free ends adapted to be spread apart, means for spreading said shoes and arranged to substantially equalize the spreading pressure on the shoes regardless of any unequal movement necessary to bring the shoes into contact with the drum, releasable resilient means positioning said spreading means relative to said anchor element and when released allowing the resilient positioning means to assume a position of substantial equilibrium of internal stresses when said shoes are in contact with the drum.

21. In braking mechanism, a brake drum, a brake shoe device having relatively movable parts, differentially acting means for moving said parts into engagement with said drum, resilient means resisting said differential action and adjustable means to permit the adjusting of said resilient means to a substantial balance of internal stresses when said brake shoe device is in engaged position with said drum.

22. A brake drum, a brake shoe device having relatively movable parts, floating means for bringing said parts into engagement with said drum, a resilient element disposed to position said floating means by its resistance to the distortion caused by said floating action and adjusting means associated therewith to allow such positioning of the floating means to be varied.

23. A brake drum, a brake shoe device having relatively movable parts, a resilient element, means to constrain said resilient element in initial distortion, means to bring said brake shoe device into frictional engagement with said drum, said last named means being capable of a floating action, means to resist said floating action by resistance to further distortion of said resilient element, means to relieve said resilient member of any such further distortion caused by said floating action.

24. A brake drum, a brake shoe device having relatively movable parts, differentially acting actuating means arranged to bring said brake shoe device into frictional engagement with said drum, a resilient member, means to hold said resilient member in initial distortion, means to cause the differential action of said differentially acting actuating means to unbalance the balance of internal stresses caused by the initial distortion of said resilient member, and lockable means which when released will allow said resilient means to return to the balance of internal stresses imposed by said means holding said resilient means in initial distortion.

25. In braking mechanism, a drum, an anchor member, a friction element having relatively movable parts with ends spaced apart spreading means adapted to force said spaced ends apart to bring said friction element into frictional engagement with said drum, means to allow a compensating movement of said spreading means and resilient means for normally holding said spreading means in predetermined position and restoring it to said position when displaced therefrom, said holding means being yieldable to permit the spreading means to substantially equalize the pressure of the spreading means against the respective spaced apart ends of the friction element and means to adjust the normal position of said spreading means.

26. That method of adjusting a brake having a floating actuating means adjustably positioned by resistance to deformation of a resilient member which comprises the step of applying the brake and then adjusting the resilient member so that the resistance to deformation of said resilient member will position the actuating means in the position said actuating means has assumed with the brakes applied.

27. That method of adjusting a brake including a differentially acting actuating means normally positioned by resistance to deformation of a resilient member, and including lockable means to release the positioning influence of said resilient member which comprises the step of applying the brake with the positioning influence of the resilient member released and then locking the said releasable means with the brakes in applied position so that the internal stresses of the resilient member will not be unbalanced by any differential action of the actuating means when the brakes are in applied position.

28. The method of adjusting brake mechanism having an element capable of being fixed in any one of a plurality of positions which comprises applying the brake and fixing said element in the position assumed thereby when said brake is in applied condition.

29. The method of adjusting brake mechanism comprising a brake drum, brake shoes, and an element connected with the latter and capable of being fixed in any one of a plurality of positions which comprises applying said shoes to said drum and fixing said element in the position assumed thereby when said shoes are so applied.

In witness whereof, I hereunto subscribe my name to this specification.

LOUIS C. HUCK.